UNITED STATES PATENT OFFICE.

GURDON S. FANNING AND JAMES M. FANNING, OF AUBURN, NEW YORK.

PROCESS OF CLEANSING BEER-CASKS.

SPECIFICATION forming part of Letters Patent No. 231,219, dated August 17, 1880.

Application filed August 4, 1879.

*To all whom it may concern:*

Be it known that we, GURDON S. FANNING and JAMES M. FANNING, of the city of Auburn, county of Cayuga and State of New York, have invented and discovered a new and useful Process for Cleansing and Purifying Musty, Stinking, and Tainted Ale, Beer, and Wine Casks, or other Wooden Vessels, which process is fully set forth in the following specification.

This invention and discovery relates to a process for removing the must, taint, and stink from ale, beer, wine, and liquor casks or wooden vessels, thereby rendering them sweet and wholesome for use.

In the application of our discovery and invention the musty or tainted or stinking cask or vessel to be cleansed and rendered sweet must be filled about one-third ($\frac{1}{3}$) full of sour or stale ale or beer, or vinegar, or sour wine, or any other acidulated or acidiferous saccharine fluid. Then it is to be heated (by introducing a jet of steam or otherwise) to the boiling-point and boiled for from twenty (20) to sixty (60) minutes, according to the degree of taint or must or stink in the cask or vessel to be removed, which will entirely remove and permanently correct and cure the cask or vessel so treated, leaving it ready and fit for immediate use after rinsing.

The terms "must," "taint," and "stink" are used in the foregoing specification as the qualities thereby indicated are commonly termed and understood among brewers.

What we claim as our invention, and desire to secure by Letters Patent, is—

The process of removing must, taint, and stench from ale, beer, wine, and other casks or wooden vessels by introducing therein sour beer or acidulous saccharine fluid until about one-third full, heating said liquid to the boiling-point by a jet of steam or otherwise, and boiling it for from twenty to sixty minutes, substantially as and for the purpose described.

GURDON S. FANNING.
JAMES M. FANNING.

Witnesses:
GEO. SKINNER,
HUDSON I. GREENE.